United States Patent [19]

Kreft

[11] Patent Number: 4,504,288
[45] Date of Patent: Mar. 12, 1985

[54] TUBULAR-FILTER DEVICE WITH COMPRESSED-AIR CLEANOUT

[75] Inventor: Rolf H. Kreft, Beckum, Fed. Rep. of Germany

[73] Assignee: Ventilatorenfabrik Oelde GmbH, Oelde, Fed. Rep. of Germany

[21] Appl. No.: 560,724

[22] Filed: Dec. 12, 1983

[30] Foreign Application Priority Data

Apr. 29, 1983 [DE] Fed. Rep. of Germany ... 8312704[U]

[51] Int. Cl.³ .................................................. B01D 46/04
[52] U.S. Cl. .................................... 55/302; 55/341 R; 55/379; 55/381
[58] Field of Search ............... 55/302, 341 R, 378, 55/379, 381, 382, 362, 365

[56] References Cited

U.S. PATENT DOCUMENTS

| | | | |
|---|---|---|---|
| 3,830,043 | 8/1974 | Nielsen et al. | 55/378 |
| 3,844,750 | 10/1974 | Ray | 55/379 |
| 3,997,305 | 12/1976 | Ulvestad et al. | 55/379 X |
| 4,073,632 | 2/1978 | Reinauer et al. | 55/379 X |
| 4,105,421 | 8/1978 | Rheinfrank, Jr. et al. | 55/381 X |
| 4,138,234 | 2/1979 | Kubesa | 55/379 X |
| 4,149,863 | 4/1979 | Ballard | 55/381 X |
| 4,194,894 | 3/1980 | Noland | 55/379 |
| 4,256,473 | 3/1981 | De Martino | 55/379 |
| 4,289,511 | 9/1981 | Johnson, Jr. | 55/379 X |
| 4,292,057 | 9/1981 | Ulvestad et al. | 55/379 X |
| 4,293,321 | 10/1981 | Kordas | 55/379 X |
| 4,300,927 | 11/1981 | Day | 55/378 |
| 4,336,035 | 6/1982 | Evenstad et al. | 55/381 X |
| 4,364,758 | 12/1982 | Clements et al. | 55/365 |
| 4,424,070 | 1/1984 | Robinson | 55/378 |
| 4,443,237 | 4/1984 | Ulvestad | 55/379 |
| 4,445,915 | 5/1984 | Robinson | 55/378 |

FOREIGN PATENT DOCUMENTS 1187646  4/1970  United Kingdom ................. 55/365

Primary Examiner—Robert Spitzer
Attorney, Agent, or Firm—Sprung, Horn, Kramer & Woods

[57] ABSTRACT

A tubular-filter device with compressed-air cleanout has a tube-acceptor plate with insertion openings, each of which having a tubular filter fastened therein with a support basket in each tubular filter. The support basket has a resilient upper edge and the tubular filter is clamped with a band tightly in the soffit area of the insertion opening. A filter-pot cover extends into the top of the tubular filter and is attached to the top of the tube-acceptor plate. The cover has an extension that projects into the support basket and that is secured on all sides by an upper, radially sectional ring of the support basket by a snap attachment positioned along the outside thereof and cooperative with the upper ring of the support basket.

4 Claims, 4 Drawing Figures

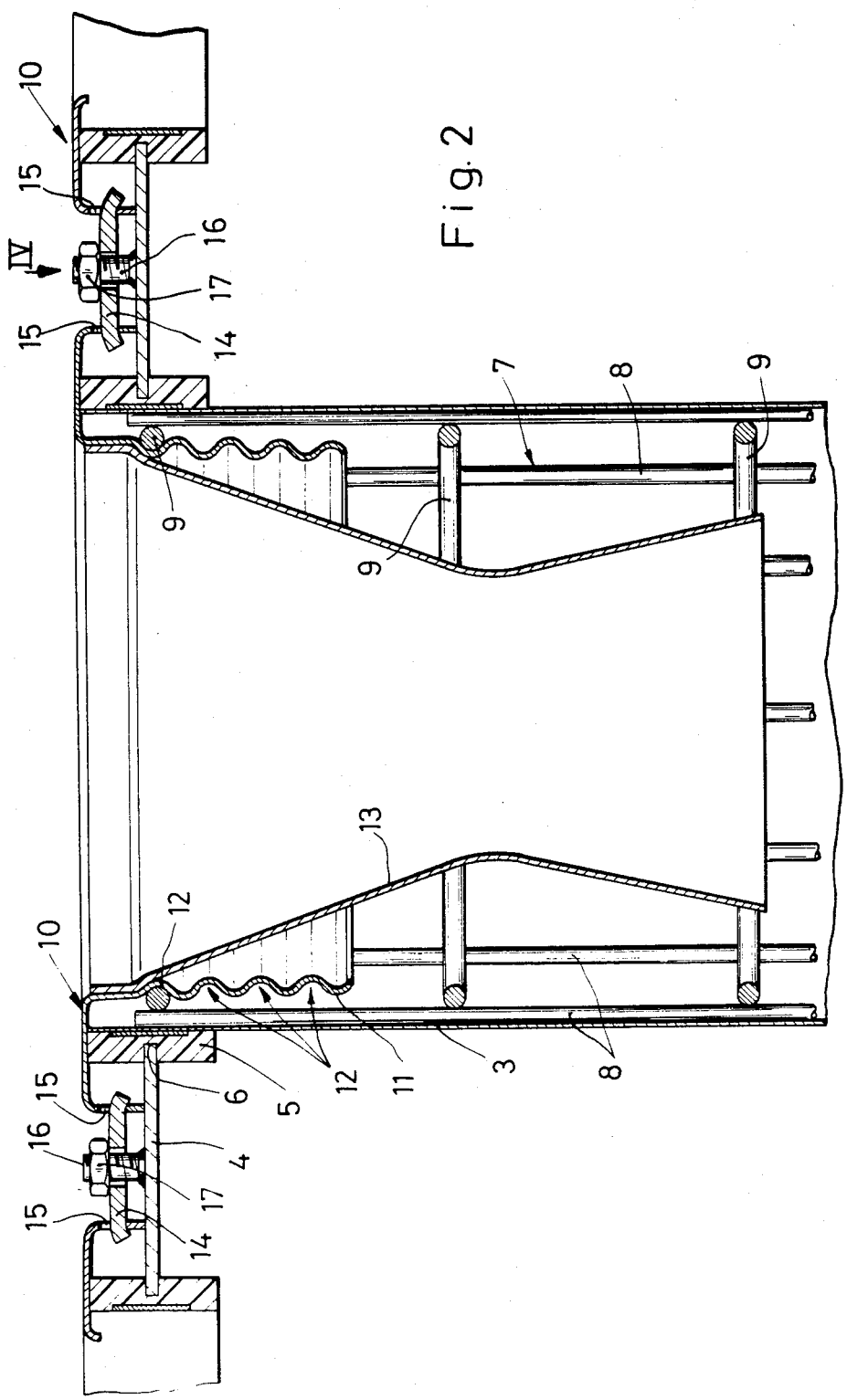

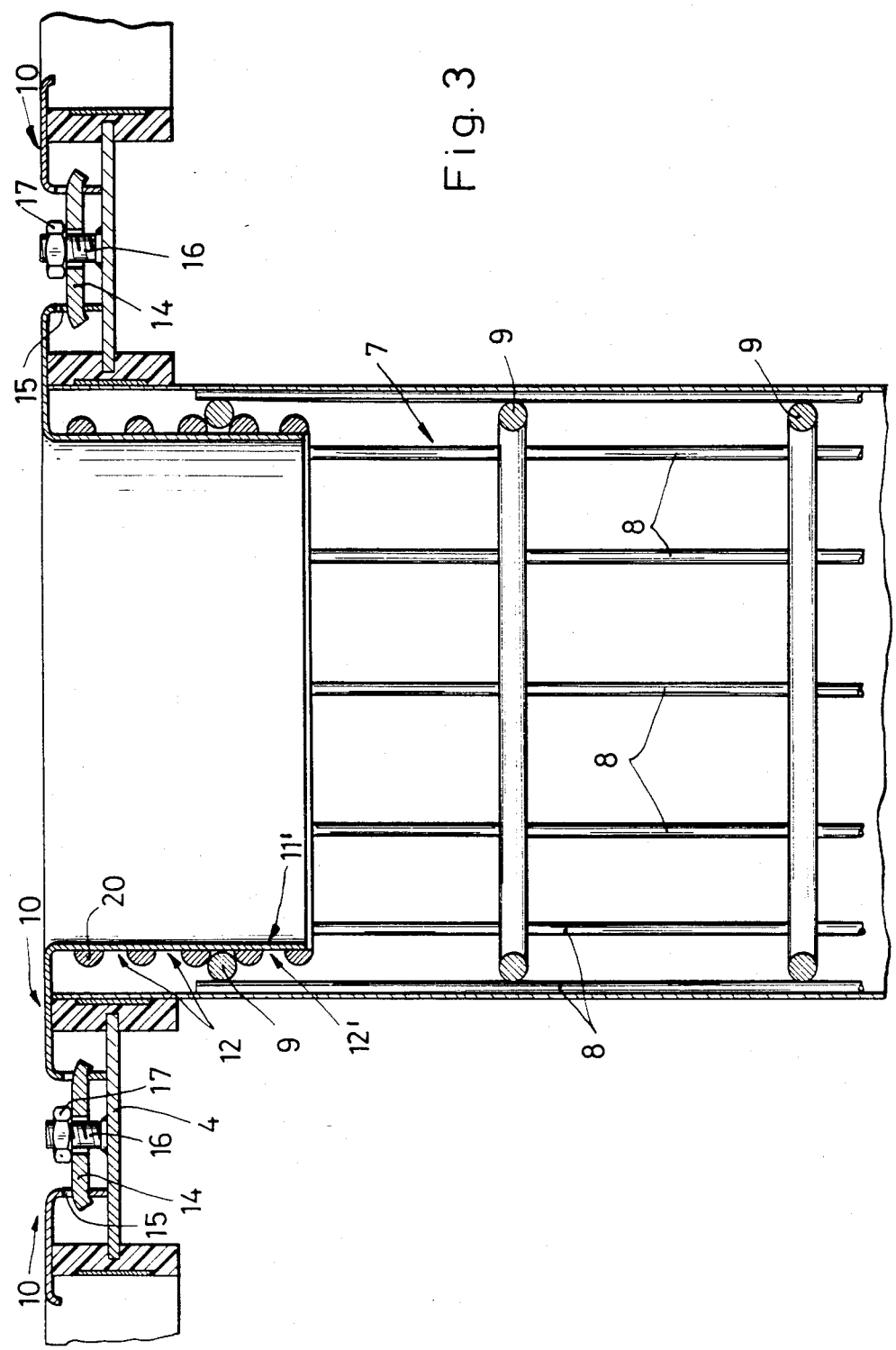

TUBULAR-FILTER DEVICE WITH COMPRESSED-AIR CLEANOUT

BACKGROUND OF THE INVENTION

The present invention relates to a tubular-filter device with compressed-air cleanout, that has a tube-acceptor plate with insertion openings. In each insertion opening, a tubular filter is fastened and each tubular filter has a support basket therein, the support basket having a resilient upper edge for clamping the tubular filter, which has a band at that area, tightly in the soffit area of the insertion opening.

Tubular-filter devices of this overall type are known in the prior art.

In the known devices, the support baskets tension the tubular filters radially. However, it has not been possible up to the present time to tension them axially as well.

SUMMARY OF THE INVENTION

The object of the present invention is to provide a tubular-filter device of the same generic type and that facilitates axial tensioning of the tubular filters.

This object is attained in accordance with the invention with a filter-pot cover extending into the top of the tubular filter, attached to the top of the tube-acceptor plate, and with an extension that projects into the support basket, that is secured on all sides by the uppermost, radially sectioned ring of the support basket, and that has means forming a snap attachment positioned along the outside for securing the uppermost ring of the support basket between the filter-pot cover and the plate.

A filter-pot cover that is designed with snap attachments in the vicinity of the extension and projecting into the support basket provides, for the first time, a simple means of tensioning the tubular filter axially as well because the upper, sectioned ring of the support basket can be displaced along the filter-pot cover extension and secured in different snap attachments.

Further characteristics of the invention are also contemplated. In a preferred embodiment, the means forming snap attachment comprises several continuous grooves spaced apart at equal intervals apart. In another preferred embodiment, an air nozzle is securely attached to the filter-pot cover.

Some preferred embodiments of the invention will now be described with reference to the attached drawings, wherein

BRIEF DESCRIPTION OF THE DRAWINGS

FIG. 2 is a vertical section through a tubular filter at the point of attachment, FIG. 3 is a section similar to that in FIG. 2 through another embodiment of the invention.

DETAILED DESCRIPTION OF THE INVENTION

Figure 1:
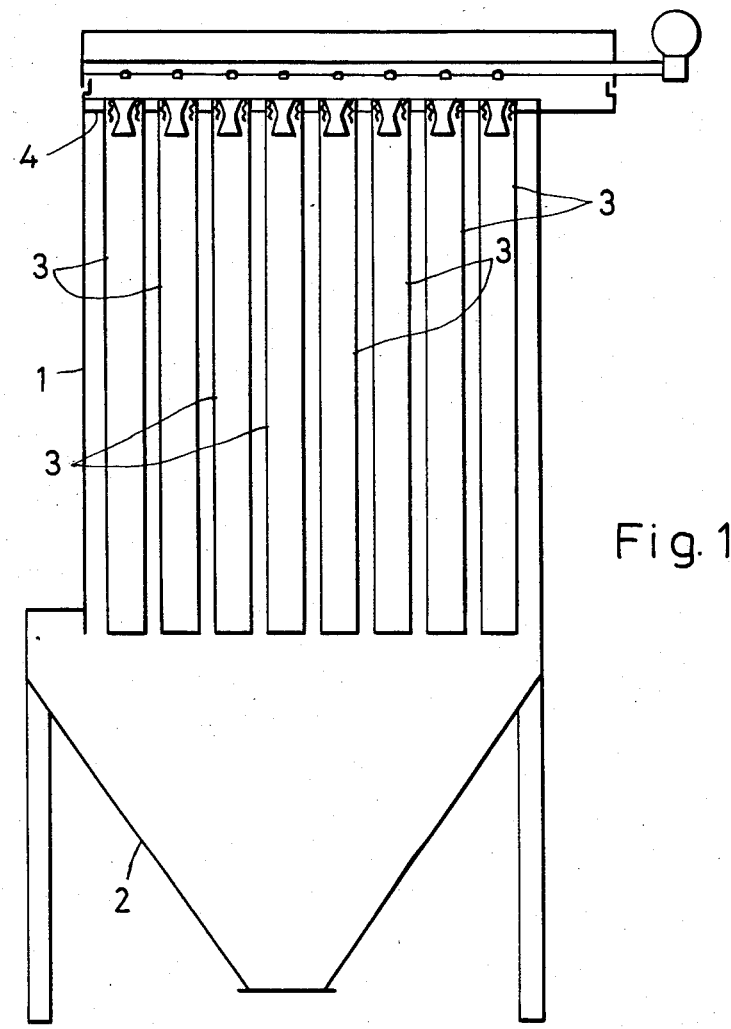
FIG. 1 is a schematic view of a tubular-filter device in accordance with the present invention.

The tubular-filter device in FIG. 1 essentially consists of a housing 1, a funnel 2 below the housing, and a number of tubular filters 3 inside the housing. The tubular filters 3 are mounted in a tube-acceptor plate 4.

As will be evident from FIG. 2, each tubular filter 3 has a band 5 made out of an resilient material that is affixed at the top thereof and that is clamped into one of the insertion openings 6 in tube-acceptor plate 4.

A support basket 7 consisting of vertical rods 8 and several rings 9 is positioned inside each tubular filter 3. The uppermost ring 9 of each support basket 7 is radially sectioned so that the top of the basket can be compressed.

Figure 4:
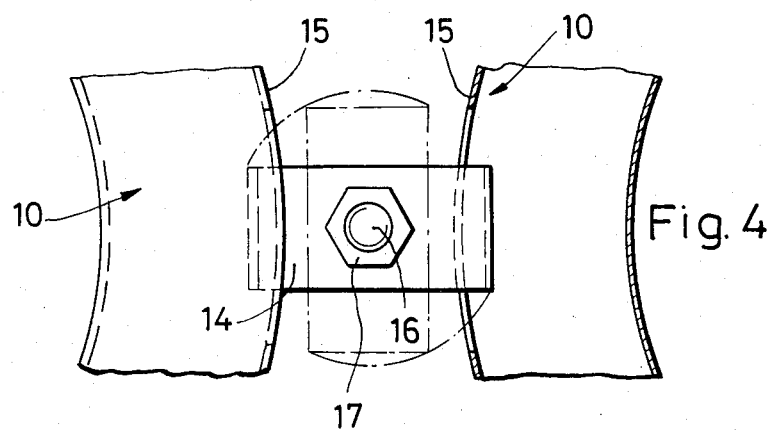
FIG. 4 is a partial section along the line IV—IV in FIG. 2.

A filter-pot cover 10 has an extension 11 that projects into tubular filter 3 and support basket 7 and has a portion including recess 15 which is attached to the top of tube-acceptor plate 4, as will be explained hereinafter with respect to FIG. 4.

Means forming a snap attachment includes continuous grooves 12 around the circumference of extension 11 and spaced apart at equal axial intervals. The uppermost ring 9 of support basket 7 non-positively engages any one of these grooves 12, preventing the axial displacement of the basket.

To insert support basket 7 deeper into tubular filter 3 in order to tension the filter, the fastening of filter-pot cover 10 is released, the cover partly extracted from insertion opening 6 until support basket 7 is accessible upper ring 9 is snapped into a lower groove 12, and filter-pot cover 10 is fastened again to tube-acceptor plate 4. Since uppermost ring 9 has been shifted down one groove, the bottom of support basket 7 will also be displaced downward by the same distance and tubular filter 3 will be subject to axial tension. If support basket 7 has to be shifted farther down to increase the axial tension even more, the same process is repeated.

In a departure from the embodiment illustrated in FIG. 2, as shown in FIG. 3 the means forming the snap attachment on the extension 11' of filter-pot cover 10' can have different designs extending along the outside thereof. Thus, extension 11' is cylindrical and has retaining rings 20 secured at equal intervals along the outside thereof and between which grooves 12' are formed in which the upper ring 9 of support basket 7 can be secured. Extension 11 can also have retaining clips or similar devices distributed around its circumference to non-positively fasten the upper ring 9 on extension 11 in various positions.

The filter-pot cover 10 of the embodiment illustrated in FIG. 2 has an air nozzle 13 securely attached to it. Compressed air can thus be introduced through nozzle 13 to clean tubular filter 3.

The filter-pot cover 10' of the embodiment illustrated in FIG. 3 lacks an air nozzle. It is also possible to introduce an air nozzle into the vicinity of the upper opening of tubular filter 3 in a different way.

Each filter-pot cover 10 is fastened to tube-acceptor plate 4 with a clamp 14 that engages a recess 15 between each pair of filter-pot covers 10 and is tensioned by a nut 17 screwed onto a screw 16. Recesses 15 are large enough for the clamps 14 to be rotated out of them once nuts 17 have been loosened on screws 16 as will be evident from FIG. 4. This facilitates releasing and fastening filter-pot covers 10.

It will be appreciated that the instant specification and claims are set forth by way of illustration and not limitation, and that various modifications and changes may be made without departing from the spirit and scope of the present invention.

What is claimed is:

1. In a tubular-filter device with compressed-air cleanout having a tube-acceptor plate with insertion openings in the top thereof and a tubular filter for each opening having a resilient band around the top thereof for axially fastening same in the opening, the improvement comprising: a support basket in each filter having an upper radially sectioned ring; a filter-pot cover having a portion extending into the top of the tubular filter and support basket; means attaching the filter pot cover to the top of the tube-acceptor plate; and means disposed on the portion of the filter-pot cover that extends into the support basket and cooperative with the radially sectioned ring of the support basket to form a snap attachment for axially securing the upper ring of the support basket to the filter-pot cover in any one of a plurality of axial positions relative to the top of the tubular filter, whereby the tubular filter can be axially tensioned by moving the basket axially away from the fixed top of the filter.

2. The tubular-filter device in claim 1, wherein the means forming the snap attachment comprises several continuous grooves spaced apart at equal intervals along the portion of the filter-pot cover extending into the basket.

3. The tubular-filter device in claim 2, further comprising an air nozzle securely attached in the filter-pot cover.

4. The tubular-filter device in claim 1, further comprising an air nozzle securely attached in the filter-pot cover.

* * * * *